(12) United States Patent
Lavergne

(10) Patent No.: US 8,191,461 B2
(45) Date of Patent: Jun. 5, 2012

(54) HYDRAULIC CYLINDER PISTON

(75) Inventor: Hans-Peter Lavergne, Trunkelsberg (DE)

(73) Assignee: Liebherr-Hydraulikagger GmbH, Kirchdorf/Iller (DE)

( * ) Notice: Subject to any disclaimer, the term of this patent is extended or adjusted under 35 U.S.C. 154(b) by 807 days.

(21) Appl. No.: 11/918,105

(22) PCT Filed: Mar. 10, 2006

(86) PCT No.: PCT/EP2006/002237
§ 371 (c)(1),
(2), (4) Date: Jan. 21, 2009

(87) PCT Pub. No.: WO2006/105851
PCT Pub. Date: Oct. 12, 2006

(65) Prior Publication Data
US 2009/0120282 A1  May 14, 2009

(30) Foreign Application Priority Data

Apr. 8, 2005  (DE) ..................... 20 2005 005 625 U
Apr. 22, 2005 (DE) ..................... 20 2005 006 469 U

(51) Int. Cl.
*F16J 1/12* (2006.01)
*F15B 15/20* (2006.01)

(52) U.S. Cl. .......................................... 92/258; 92/255
(58) Field of Classification Search .................... 92/128, 92/129, 255, 257, 258, 259
See application file for complete search history.

(56) References Cited

U.S. PATENT DOCUMENTS

| 1,438,910 | A | * | 12/1922 | Frith | ................. 92/257 |
| 1,538,132 | A | | 5/1925 | Minnier | |
| 2,188,106 | A | * | 1/1940 | Caldwell | ............ 92/258 |
| 3,066,003 | A | * | 11/1962 | Thassy | .............. 92/258 |
| 3,066,033 | A | | 11/1962 | Thassy | |
| 4,815,360 | A | | 3/1989 | Winterle | |
| 6,386,088 | B1 | | 5/2002 | Yoshimoto et al. | |

FOREIGN PATENT DOCUMENTS

| CH | 320862 | 4/1957 |
| DE | 1801483 | 8/1969 |
| DE | 2448019 | 4/1975 |
| FR | 543109 | 8/1922 |

* cited by examiner

*Primary Examiner* — Thomas E Lazo
(74) *Attorney, Agent, or Firm* — Dilworth & Barrese, LLP

(57) ABSTRACT

The invention relates to a hydraulic cylinder piston comprising a piston rod and a piston connected thereto. In accordance with the invention, the piston can be tensioned with respect to the piston rod via a screw system comprising two threaded rings, with the inner threaded ring of the two threaded rings comprising a removable tensioning element for the application of the pre-tension and with the outer threaded ring being movable relative to the inner threaded ring.

20 Claims, 1 Drawing Sheet

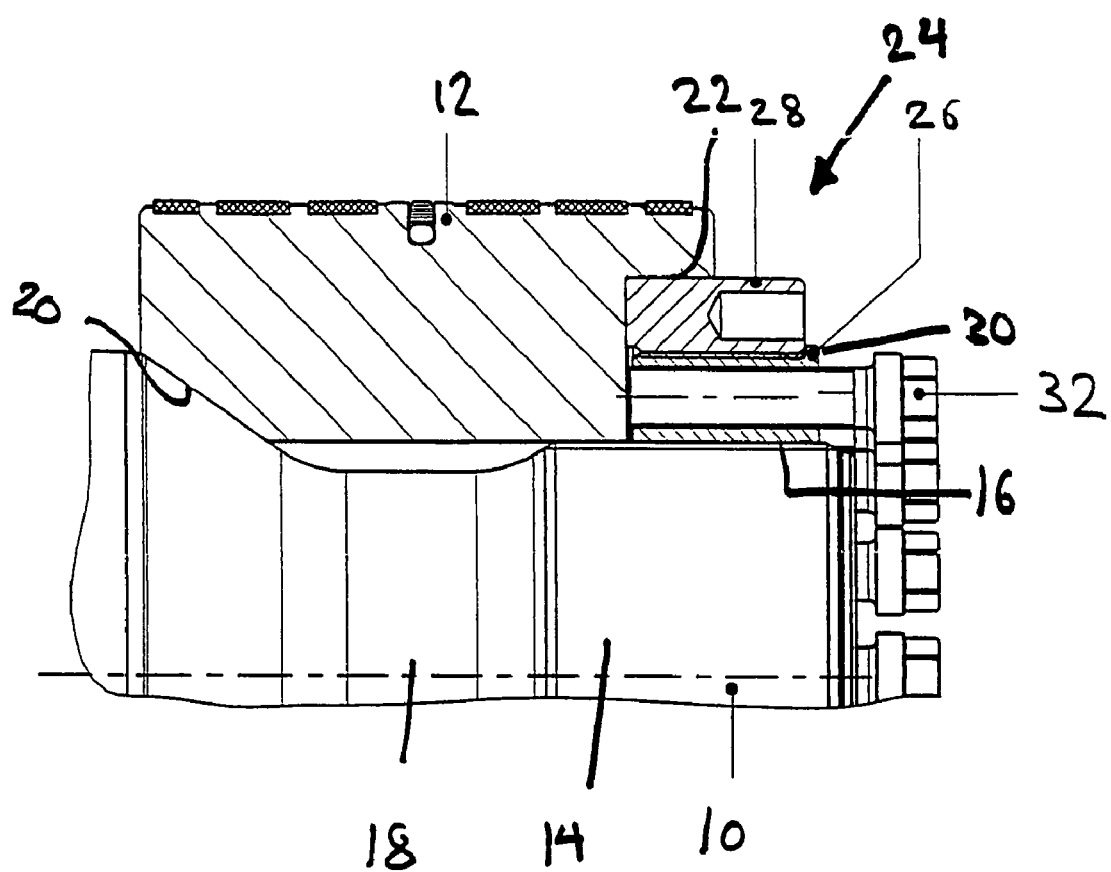

HYDRAULIC CYLINDER PISTON

BACKGROUND OF THE INVENTION

The invention relates to a hydraulic cylinder piston comprising a piston rod and a piston connected thereto.

The connection of piston rod to piston in a hydraulic cylinder is usually established by a pre-tensioned screwed piston. As a rule, a screwed piston with a nut is used. With large piston diameters, this type of connection requires a tightening torque on assembly which can only be applied with difficulty and unreliably under simple maintenance conditions.

This type of connection is also prone to disruption, as is frequently found in service work. The thread on piston and nut is namely here often no longer usable because the thread is deformed due to a lack of pre-tension. This has the consequence of the failure of the piston rod and of the piston.

A further solution comprises a connection of the piston with socket headless screws. There is a risk of the loosening of individual screws here. If they should break, there is the risk that they enter into the hydraulic system in the form of small parts and cause defects there.

SUMMARY OF THE INVENTION

It is therefore the object of the invention to further develop a generic hydraulic cylinder piston such that the piston rod can be connected to the piston in a simpler and more reliable manner.

This object is solved in accordance with the invention by a hydraulic cylinder piston having the features herein. The piston can accordingly be tensioned with respect to the piston rod via a screw system comprising two threaded rings. The inner threaded ring of the two threaded rings comprises a removable tensioning element for the application of the pre-tension. Furthermore, the outer threaded ring is movable relative to the inner threaded ring.

The piston can be connected to the piston rod as follows using the hydraulic cylinder piston in accordance with the invention. The inner threaded ring is screwed onto the piston rod on one side of the piston. The piston is then pre-tensioned with respect to the piston rod via the removable tensioning element. After the desired tension has been reached, the outer threaded ring is now moved relative to the inner threaded ring until it contacts the piston. It is tightened with a predetermined torque in this position. The tensioning element can subsequently be removed and the system remains tensioned. If the connection has to be released again, that is if the piston has to be removed from the piston rod, the removable tensioning element is in turn placed onto the inner threaded ring for the releasing.

Advantageous aspects of the invention result from the description herein.

Accordingly, the piston can be supported at one side at an inclined shoulder of the piston rod. The corresponding tension is therefore produced by tightening the tensioning element by a corresponding sliding of the piston on the inclined plane.

The removable tensioning element can comprise a tensioning ring with screws provided circumferentially. Alternatively, the screws can also be directly screwable into the inner threaded ring.

A thread is arranged between the inner threaded ring and the outer threaded ring for the production of the relative movement between the inner threaded ring and the outer threaded ring.

Particularly advantageously, a respective projection or a nose is arranged at the inner threaded ring or at the outer threaded ring so that the screw system comprising the two threaded rings can be released in total.

BRIEF DESCRIPTION OF THE DRAWING

Further details and advantages of the invention will be explained in more detail with reference to an embodiment shown in the drawing.

DESCRIPTION OF THE PREFERRED EMBODIMENT

The only FIGURE shows a longitudinal section through the end region of a hydraulic cylinder piston comprising a piston rod 10 and a piston 12 which are arranged in a hydraulic cylinder not shown in any more detail here. The piston rod 10 has a shoulder 14 at its one end which bears an external thread 16. A partial region 18 which is set back in diameter adjoins this shoulder 14 and passes via a shoulder incline 20 to the nominal diameter of the remaining piston rod. The piston 12 contacts the shoulder incline 20 in the manner shown in the FIGURE. The piston 12 has a recess 22 running around the periphery on the opposite side. A screw connection 24 comprising an inner threaded ring 26 and an outer threaded ring 28 can be screwed into this recess 22. Both threaded rings 26 and 28 are movable with respect to one another via a screw thread. The inner threaded ring 26 has a nose or a projection 30 which secures the outer threaded ring 28 on the inner threaded ring 26.

The inner threaded ring 26 as the tensioning element bears tensioning screws 32 all around the circumference.

The piston 12 can be pre-tensioned and held using the screw system shown here. For this purpose, the inner threaded ring 26 is tensioned in a defined manner with the piston 12 using the tensioning screws 32 screwed in it. The correspondingly defined tension can be applied by the torque of the screws 32. Once the desired pre-tension condition has been reached, the outer threaded ring is moved over the inner threaded ring in the direction of the piston until it contacts the piston. It can then be tightened with a pre-determined torque. The screws 32 forming the tensioning element are subsequently removed and the total system, that is the piston 12, remains tensioned on the piston rod 10. The tensioning element comprising the screws 32 is used again for the releasing so that the aforesaid steps take place in the reverse order.

With the nut shown here, a high tensioning can be reached with low tightening torques. A controlled and defined tightening process is possible.

If the system becomes lose in operation, no small parts can enter into the hydraulic system, on the one hand. On the other hand, a gap arises at the contact surface of the piston to the piston rod which is inclined in the embodiment shown. The pressurized oil can escape on the pressureless side, which results in a clear functional disturbance which can be recognized in operation before large damage occurs here.

The invention claimed is:

1. A hydraulic cylinder piston comprising a piston rod and a piston connected to this piston, wherein the piston can be tensioned with respect to the piston rod via a screw system comprising two threaded rings, with the inner threaded ring of the two threaded rings comprising a removable tensioning element for the application of the pre-tension and with the outer threaded ring being movable relative to the inner threaded ring.

2. A hydraulic cylinder piston in accordance with claim 1, wherein the piston is supported at one side on an inclined shoulder of the piston rod.

3. A hydraulic cylinder piston in accordance with claim 2, wherein the removable tensioning element comprises a tensioning ring with circumferentially provided screws.

4. A hydraulic cylinder piston in accordance with claim 3, wherein a thread is provided between the inner threaded ring and the outer threaded ring for the generation of the relative movement between them.

5. A hydraulic cylinder piston in accordance with claim 4, wherein a projection is in each case arranged at the inner threaded ring or at the outer threaded ring which secures the inner threaded ring and the outer threaded ring with respect to one another.

6. A hydraulic cylinder piston in accordance with claim 2, wherein the removable tensioning element applies the required tensioning force via hydraulic elements, for example hydraulic cylinders.

7. A hydraulic cylinder piston in accordance with claim 6, wherein a thread is provided between the inner threaded ring and the outer threaded ring for the generation of the relative movement between them.

8. A hydraulic cylinder piston in accordance with claim 7, wherein a projection is in each case arranged at the inner threaded ring or at the outer threaded ring which secures the inner threaded ring and the outer threaded ring with respect to one another.

9. A hydraulic cylinder piston in accordance with claim 6, wherein a projection is in each case arranged at the inner threaded ring or at the outer threaded ring which secures the inner threaded ring and the outer threaded ring with respect to one another.

10. A hydraulic cylinder piston in accordance with claim 2, wherein a thread is provided between the inner threaded ring and the outer threaded ring for the generation of the relative movement between them.

11. A hydraulic cylinder piston in accordance with claim 10, wherein a projection is in each case arranged at the inner threaded ring or at the outer threaded ring which secures the inner threaded ring and the outer threaded ring with respect to one another.

12. A hydraulic cylinder piston in accordance with claim 1, wherein the removable tensioning element comprises a tensioning ring with circumferentially provided screws.

13. A hydraulic cylinder piston in accordance with claim 12, wherein a thread is provided between the inner threaded ring and the outer threaded ring for the generation of the relative movement between them.

14. A hydraulic cylinder piston in accordance with claim 13, wherein a projection is in each case arranged at the inner threaded ring or at the outer threaded ring which secures the inner threaded ring and the outer threaded ring with respect to one another.

15. A hydraulic cylinder piston in accordance with claim 1, wherein the removable tensioning element applies the required tensioning force via hydraulic elements, for example hydraulic cylinders.

16. A hydraulic cylinder piston in accordance with claim 15, wherein a thread is provided between the inner threaded ring and the outer threaded ring for the generation of the relative movement between them.

17. A hydraulic cylinder piston in accordance with claim 16, wherein a projection is in each case arranged at the inner threaded ring or at the outer threaded ring which secures the inner threaded ring and the outer threaded ring with respect to one another.

18. A hydraulic cylinder piston in accordance with claim 1, wherein a thread is provided between the inner threaded ring and the outer threaded ring for the generation of the relative movement between them.

19. A hydraulic cylinder piston in accordance with claim 1, wherein a projection is in each case arranged at the inner threaded ring or at the outer threaded ring which secures the inner threaded ring and the outer threaded ring with respect to one another.

20. A system for the early recognition of a defective hydraulic cylinder piston using a hydraulic cylinder piston in accordance with claim 1.

* * * * *